(12) United States Patent
Foreman

(10) Patent No.: US 7,719,126 B2
(45) Date of Patent: May 18, 2010

(54) SYSTEM AND METHOD FOR POWERING THE CABIN OF A TRUCK

(75) Inventor: Rodney Foreman, 183 Thomas Street, Dieppe, NB (CA) E1A 2C3

(73) Assignees: Rodney Foreman, New Brunswick (CA); Clyde Orville Downey, New Brunswick (CA)

( * ) Notice: Subject to any disclaimer, the term of this patent is extended or adjusted under 35 U.S.C. 154(b) by 165 days.

(21) Appl. No.: 11/962,475

(22) Filed: Dec. 21, 2007

(65) Prior Publication Data

US 2008/0164082 A1  Jul. 10, 2008

Related U.S. Application Data

(60) Provisional application No. 60/876,147, filed on Dec. 21, 2006.

(51) Int. Cl.
*B60K 11/00* (2006.01)
*H02M 1/00* (2007.01)

(52) U.S. Cl. ........................................ 290/4 A
(58) Field of Classification Search ................. 290/4 A
See application file for complete search history.

(56) References Cited

U.S. PATENT DOCUMENTS

| | | | | |
|---|---|---|---|---|
| 4,448,157 | A * | 5/1984 | Eckstein et al. | 123/142.5 R |
| 4,611,466 | A * | 9/1986 | Keedy | 60/714 |
| 5,333,678 | A * | 8/1994 | Mellum et al. | 165/42 |
| 5,908,069 | A * | 6/1999 | Baldwin et al. | 165/41 |
| 6,232,679 | B1 | 5/2001 | Norton | |
| 6,681,588 | B2 * | 1/2004 | Zeigler | 62/239 |
| 7,013,646 | B1 * | 3/2006 | Serkh et al. | 60/698 |
| 7,049,707 | B2 * | 5/2006 | Wurtele | 290/1 B |
| 7,145,788 | B2 * | 12/2006 | Plummer | 363/141 |
| 7,245,033 | B2 * | 7/2007 | Wurtele | 290/1 A |
| 2003/0034147 | A1 * | 2/2003 | Houck et al. | 165/42 |
| 2003/0070849 | A1 * | 4/2003 | Whittaker | 180/68.2 |
| 2003/0141049 | A1 * | 7/2003 | Kennedy | 165/202 |
| 2004/0231831 | A1 * | 11/2004 | Houck et al. | 165/202 |

(Continued)

FOREIGN PATENT DOCUMENTS

JP         2005098623 A   *   4/2005

OTHER PUBLICATIONS

FAX from Alan J. Kasper dated Dec. 18, 2009.*

*Primary Examiner*—Joseph Waks
(74) *Attorney, Agent, or Firm*—Sughrue Mion, PLLC

(57) ABSTRACT

A system and method for providing continuous AC/DC current for powering the appliances used by a truck driver in the cabin of transportation trucks in an economic and environment-friendly manner especially in countries that enforce non-idling laws on heavy trucks. The power generated in accordance with the presence invention relies only on the combustion engine of the reefer, independently of the main engine system of the truck. DC current is generated by an alternator, or a plurality thereof if needed, and then inverted into AC using an inverter. It is also possible to power the main engine and charge the batteries of the truck through the system when the truck is running using a switch that interrupts the main alternator of the main engine system of the truck reducing friction and power losses, which allows for more fuel savings and reduction in polluting gases emitted in the atmosphere.

16 Claims, 6 Drawing Sheets

U.S. PATENT DOCUMENTS

2005/0016713 A1* 1/2005 Houck et al. .................. 165/42
2007/0052241 A1* 3/2007 Pacy .......................... 290/1 R
2008/0023965 A1* 1/2008 Cagliari et al. .............. 290/1 B

* cited by examiner

SYSTEM AND METHOD FOR POWERING THE CABIN OF A TRUCK

FIELD OF THE INVENTION

The invention relates generally to the transportable container industry and the problem of providing a reliable power source to the cabin of the truck. In particular, the invention relates to a method and a system for providing an AC/DC power source using the power generated by the combustion engine of the refrigeration unit.

BACKGROUND OF THE INVENTION

Due to the environment changes, Governments of the industrialized countries are inclined to apply more restricted rules on fuel powered vehicles, and mostly transportation trucks. For instance, non-idling laws are coming into force, whereby, heavy trucks are not allowed to keep the engine running when the truck is not moving.

Depending on the laws of each country or state, each driver is required by law to rest for an average of 10 hours after driving for 14 hours, and virtually most of the electrical appliances used at home are also used in the cabin of the truck especially in heavy-duty trucks, in which, drivers often spend weeks on the road transporting goods.

Accordingly, truck drivers are forced to look for other alternatives in order to power the refrigeration unit and the cabin of the trailer when the truck is parked for maintenance or when the driver is resting. These alternatives include an external power source if the truck is parked in a parking that provides this facility, or a bank of batteries which charges when the main engine of the truck is on and enables for few hours of non-idling power, or a combustion engine with an alternator which provides DC power.

DC Appliances are very expensive and at the same time known to have a more frequent failure and breakdown. Additionally, the provision of DC power to the cabin for all the appliances requires large diameter cables which are expansive and subject to stealing especially when the driver parks the truck and rests in the cabin.

Several attempts have been made in the past for providing the cabin of the truck with a source of power that enable AC appliances in the cabin to function, such as televisions, fridges, microwaves etc.

FIG. 1 illustrates a conventional system for providing AC power to the cabin of a truck as published on the following website http://www.oksolar.com/inverters/truck_inverters.htm. The system includes a bank of batteries which are connected to the alternator of a truck for charging when the truck's engine is on. An inverter is then used for inverting the DC power to an AC power for powering the AC appliances in the cabin of the truck. The problem with this design is the short period of non-idling power, depending on the number of appliances being used in the cabin and the amount of power consumed thereby, in addition to the external load created on the alternator of the truck.

Another system marketed under the name COMFORT-PRO™ provides an auxiliary power unit with DELTEK™ diesel-electric technology which runs of the truck's fuel supply and powers the cab accessories directly. This system is also expansive and complicated, and requires substantial changes in the pre-existing heating and cooling system of the truck cabin. Similar alternatives and auxiliary power units which require additional combustion engines are disclosed in the following websites:

www.tempastart.com
www.autothermusa.com
www.nitesystem.com
www.saferco.com
www.espar.com
www.auxgenerators.com
www.auxiliarypowerdynamics.com
www.rigmasterpower.com
www.trucktrailer.carrier.com Furthermore, U.S. Pat. No. 6,232,679 describes a combined heat and electricity generating unit that is suitable for use in class 8 trucks and the like. When it is operating it provides heat for keeping the engine and cabin warm and electricity for use by the electricity consuming devices in the cabin.

Therefore, there has been a need for a simple, economic and at the same time environment friendly back-up system for providing A/C power to the cabin of a truck.

SUMMARY OF THE INVENTION

It is an object of the present invention to provide a back-up system for supplying an A/C power source to the cabin of the truck from the combustion engine which provides power to the refrigeration unit of the trailer, which is known in the art as the "reefer", since the latter requires continuous power for heating/cooling the perishable goods loaded in the trailer.

The system can be powered by modifying the pre-existing system to upgrade the capacity of the pre-existing alternator which generates DC power to the refrigeration unit of the reefer or by adding an additional alternator. The DC output of the alternator is connected to a battery for stabilization and back-up of the power, and the battery is connected to an inverter for inverting the DC power into A/C power for the cabin of the truck.

The system or at least the inverter is preferably installed in a waterproof unit for protection against the rain/snow, road treatments, and salt since the system is to be positioned exteriorly in proximity of the alternator and the battery. The waterproof unit is dimensioned to be slightly bigger in size than the system for receiving the latter and permitting air to circulate around it, and includes a cover with a lip for surrounding the upper edge of the unit. The waterproof unit includes a fan for blowing air from the inside of the unit to the outside thereof through a one way opening including a gate structure which opens when the air is being blown to the outside, and closes otherwise for preventing water and the like from leaking to the inside of the unit. A plurality of openings are provided on the upper edge of the unit in the portion that is shielded by the lip of the cover in order to compensate for the air that is been blown to the outside, and at the same time prevent the water or rain from leaking into the unit.

In an aspect of the present invention there is provided a method for providing A/C power to the cabin of a truck having a separate combustion engine and alternator for powering the refrigeration unit of the trailer without requiring an additional APU (Auxiliary Power Unit), the method includes the steps of:

upgrading the alternator of the combustion engine or using an additional alternator;

connecting the DC output of the alternator to a battery for stabilization and backup of the current and connecting the battery to an inverter for inverting the DC power into AC power for powering the cabin of the truck; and providing the inverter in a waterproof unit having a cooling system, which allows for air circulation, and protection from rain and external water.

The above arrangement provides a reliable, lightweight, and continuous AC power source to the cabin of the truck, without adding an other combustion engine and/or alternator as in the prior systems, which is more economical and costs effective, and at the same time reduces the costs of maintenance such as oil change, and lubrication etc. . . .

BRIEF DESCRIPTION OF THE DRAWINGS

For a more complete understanding of the present invention and the advantages thereof, reference is made to the following description taken in conjunction with the accompanying figures, in which.

DETAILED DESCRIPTION OF THE INVENTION

Figure 1:
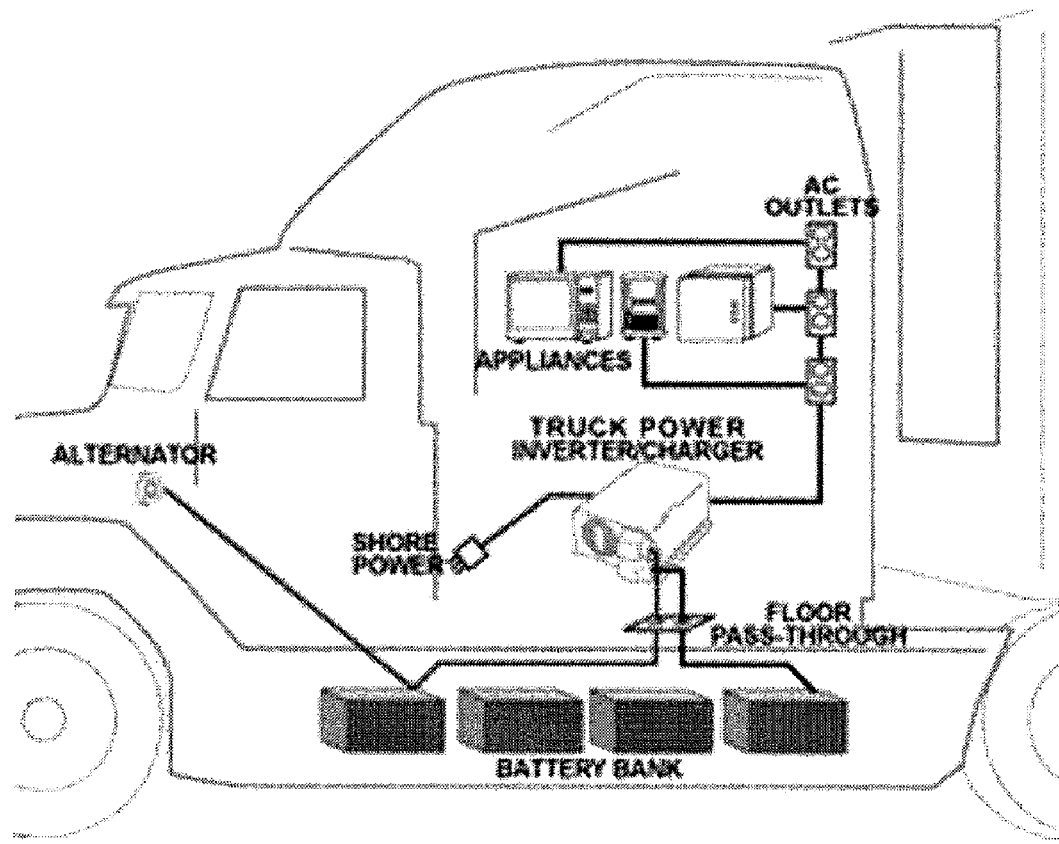
FIG. 1 illustrates a conventional system for providing A/C power using a bank of batteries and an inverter.
Figure 2:
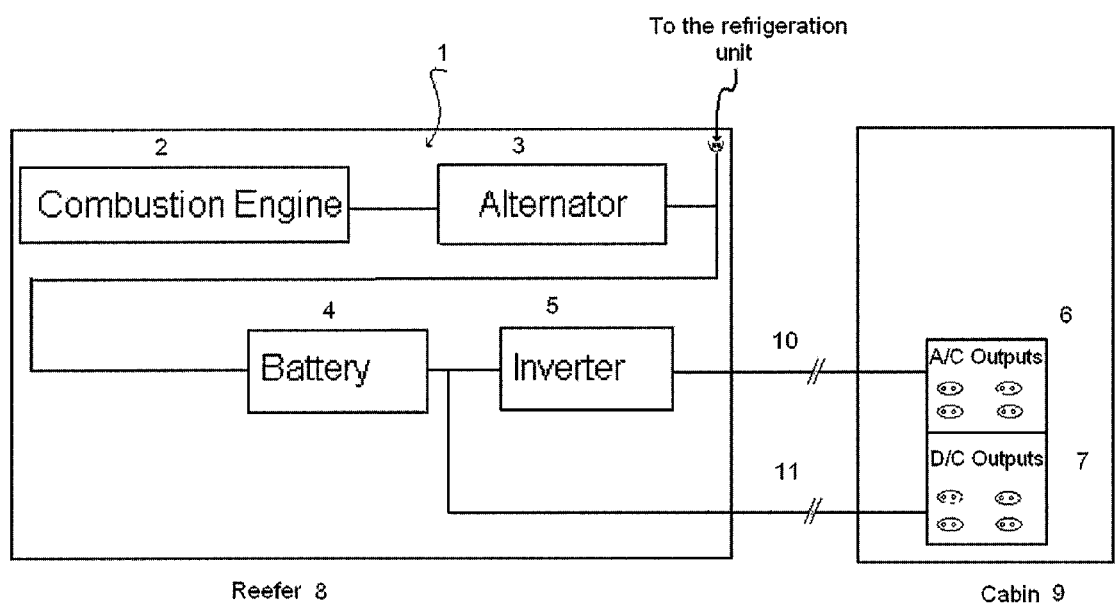
FIG. 2 is a block diagram illustrating the general structure of the powering system according to the present invention.

FIG. 2 is a block diagram representing the back up system 1 of the present invention for powering the cabin 9 of a truck from the pre-existing combustion engine 2 which generates power to the refrigeration unit though an alternator 3, in accordance with the present invention.

The combustion engine 2 is required to stay on most of the time in order provide power for heating/cooling the perishable goods loaded in the trailer. It is also possible to interrupt the power of the reefer unit 8 when it is empty, in which case, the combustion engine functions to only power the cabin 9 of the truck. The current generated by the pre-existing alternator does not suffice to power the appliances in the cabin of the truck especially if the appliances in the truck are functioning at the same time with the refrigeration unit. Therefore, an additional or more powerful alternator 3 is needed in order to provide enough current.

It is possible to use a more powerful stock alternator, however some alternators are equipped with a computer chip which communicates with another chip in the refrigeration unit and/or combustion engine for control purposes. In which case, the same alternator could be upgraded up to 120 amps to avoid any involvement in the production or interfacing of computer chips installed by the manufacturer. Whereby, power can be provided to the cabin of the truck from the pre-existing combustion engine of the reefer 8 without requiring an additional combustion engine for the cabin 9 of the truck.

The power generated by the alternator 3 is divided into two outputs. One output for the refrigeration unit (reefer) 8, and the other output for powering the cabin 9 of the truck. The latter output is preferably connected to a battery 4 for stabilization and back up purposes. Thereafter, the battery 4 is connected to the input of an inverter 5 which inverts the DC current into AC current for the AC appliances in the cabin. A DC output source is also connected from the battery 4 to the cabin 9 of the truck for providing two sources of power 12V-DC and 110 V-AC.

Figure 5:
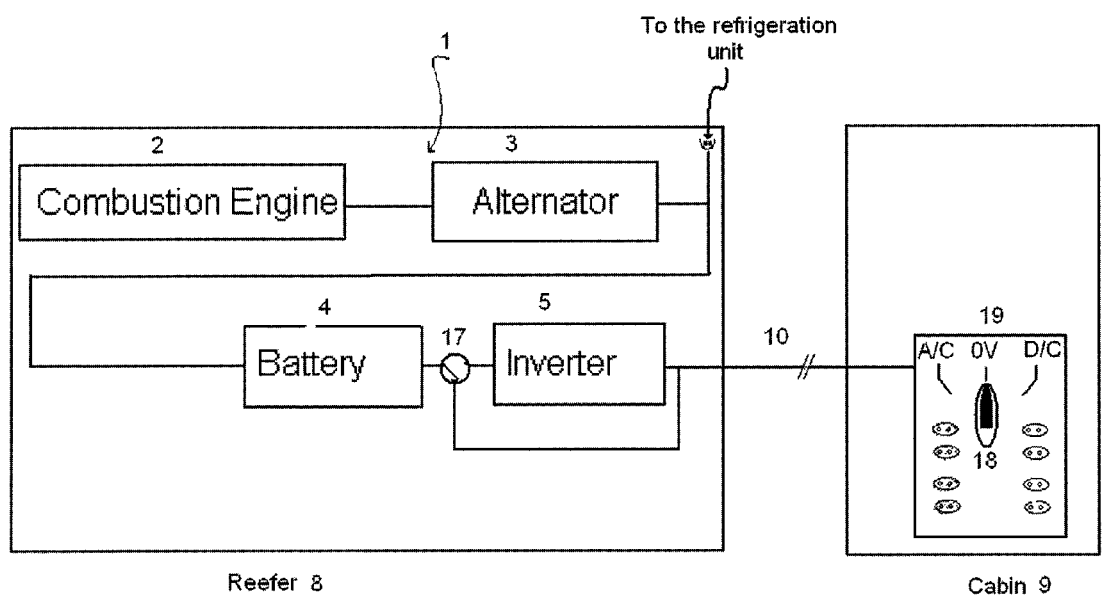
FIG. 5 is a block diagram illustrating the provision of either of DC or AC current to the cabin through one cable using a switch.

FIG. 2 illustrates 2 different cables 10 and 11 for providing AC and DC power to the cabin, respectively. The two different power sources are provided at the cabin by two different sets of outlets, one set 6 for the AC power and another set 7 for DC power. It is also possible to use a switch 17 as shown in FIG. 5, whereby through an interrupter 18 installed in the power board 19 at the cabin 9, the driver can choose between DC current, AC current or no current, whereby only one cable 10 is used to transmit power to the cabin. The switch 17 can either connect the battery to the inverter 5 to supply AC current, or connect the battery 4 directly to the cabin 9, or disconnect both. It is also possible to disconnect power from the power board 19. It is also contemplated to use a remote control to have full control of the system 1 from inside the cabin.

Figure 3:
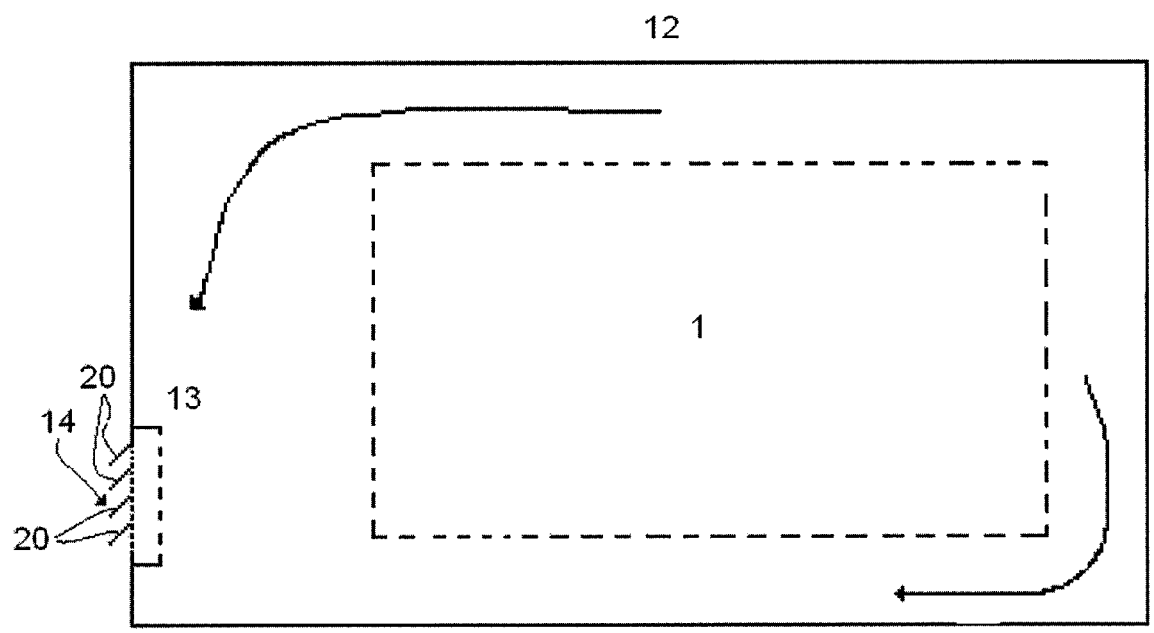
FIG. 3 illustrates a side elevational view of the waterproof unit of the present invention with an open gate structure when the fan is blowing air to the outside.
Figure 4:
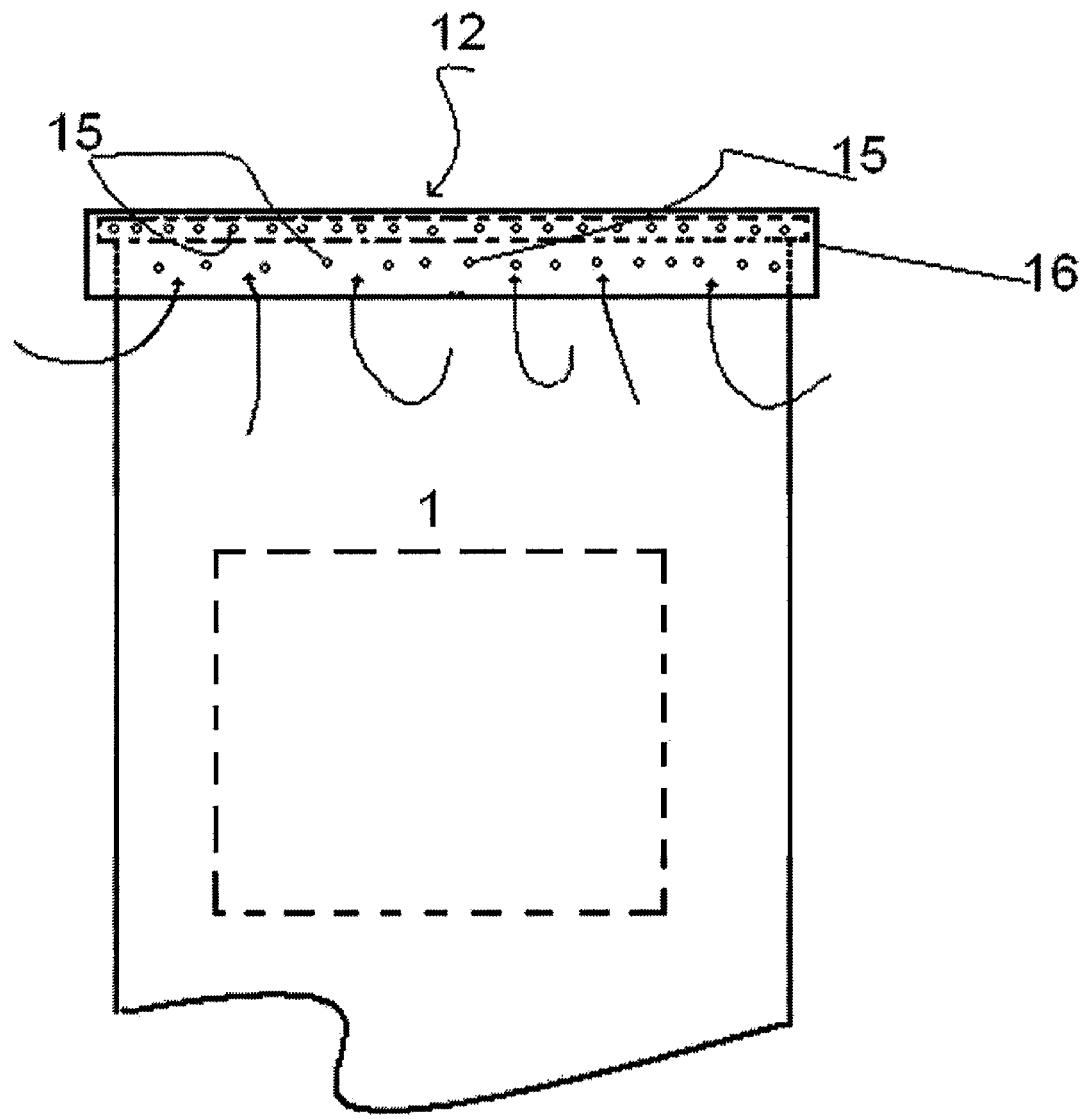
FIG. 4 illustrates the upper edge structure of the unit with a plurality of openings provided under the cover for providing air to the inside of the unit without rain and/or snow.

In a preferred embodiment, the system 1 is mounted on the reefer in proximity of the alternator 3 and battery 4 in order to decrease power losses of the DC current in the transmission cables. Therefore, since the system is installed exteriorly, the latter should be provided in a waterproof unit 12 as shown in FIGS. 3 and 4 to protect it from the rain, snow, salt and roadside treatments. However, components of the system especially the inverter 5 are subject to heat due to the wire and magnetic losses anticipated therein as a result of inverting DC current to AC current. Therefore, the unit should also have air circulation therein in order to decrease the heat involved in the current inversion process. FIG. 3 illustrates an example of a unit 12 embodying the system 1 therein. The unit includes a fan 13 which sucks air from the inside of the unit 12 and blows it to the outside thereof through an opening in the unit.

The unit 12 is dimensioned to be slightly bigger in size than the system for receiving the latter, and permitting air to easily circulate around it. The unit 12 may include a thermostat (not shown) for controlling the fan 13. For instance, the thermostat turns the fan off when the temperature inside the unit is lower than a temperature predetermined by the user for a better functioning of the inverter in extreme weather conditions, for instance in the winter time when the ambient temperature reaches −50 degrees Celsius. The fan 13 may also have different modes of operations ranging from low to medium to high according to the voltage applied thereon. Whereby the speed of the fan may be adjusted in accordance with the temperature detected by the thermostat. For instance, if the temperature is normal or close to optimal, the fan's speed is set to low, and if the temperature in the unit 12 is higher than the maximum temperature set by the user, the speed is set to maximum. It is also possible to notify the driver in the cabin, when the temperature is below the minimum or beyond the maximum so that the driver can examine the situation, and possibly decrease the power consumption in the cabin if the temperature of the inverter reached the maximum. The latter can be accomplished, by way of example, through one or a plurality of LEDs, or other display means, connected to the unit 12.

FIG. 3 illustrates a one-way gate structure 14 having one of a plurality of gates 20 which open when the air is blown from inside the unit to the outside thereof, and at the same time stop the rain and the snow from leaking to the inside of the unit 12 when they are open.

Figure 6:
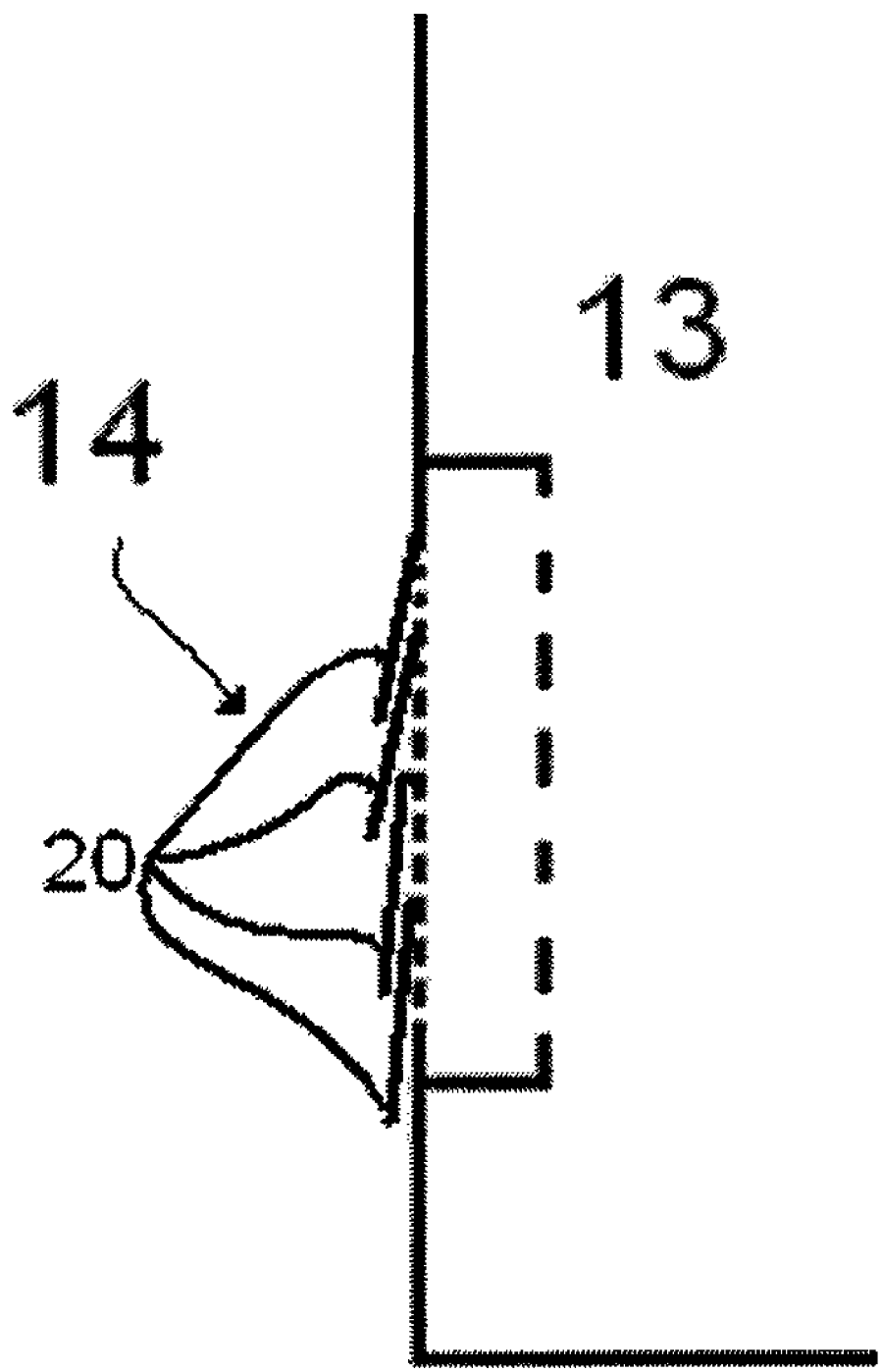
FIG. 6 is a side view of the one-way gate structure when the fan is off, and the gate is closed.

When the fan is off the one-way gate structure 14 automatically closes by force of gravity applied on the gates 20, to stop the ambient air, rain, and snow from leaking to the inside of the unit 12, as shown in FIG. 6.

A plurality of openings are needed in the walls of the unit 12, in order to compensate for the air that is blown to the outside of the unit 12 by the fan 13. Since the unit 12 needs to be waterproof for protecting the inverter 4 from the water and snow, a plurality of openings 15 are provided in a portion of the upper edge of the unit 12, that is shielded by the lip of the cover 16 which surrounds the upper edge of the unit 12, as shown in FIG. 4. Whereby, in snow and rain conditions, the fan can blow the air from inside the unit 12 to the outside thereof, and compensate for the air blown by the ambient air from underneath the lip of the cover 16 without rain and snow.

Using a switch (not shown), its is also possible to interrupt the alternator of the truck which consumes up to several horsepowers from the engine in heat, friction, and magnetic losses, and power the batteries of the truck and the truck engine system from the back up system 1 thus explained. The Switch could be a mechanical switch that mechanically stops and isolates the alternator, or an electrical switch that electrically isolates the alternator of the engine. The batteries of the truck and the truck engine system may receive DC current directly from the power board 19, or preferably, an AC current may be sent in a regular cable which can then be converted into DC at the batteries of the truck using an adapter or the like.

Accordingly, the invention provides a reliable, economic, and at the same time environmental friendly and lightweight system for powering the cabin of the truck without effecting any substantial changes to the pre-existing structure. Whereby, the system can be added or removed without affecting the overall mechanism and mechanical structure of the truck and/or cabin, especially for the truck's engine, and most importantly without requiring an additional combustion engine as an APU.

Although preferred embodiments of the invention have been disclosed in detail, it will be understood that the invention may be implemented in alternate embodiments and that various changes and modifications may be made to the embodiments illustrated herein without departing from the spirit of the invention or the scope thereof as defined in the claims.

INDUSTRIAL APPLICABILITY

The invention described herein provides a reliable, economic, and at the same time environment-friendly system for powering the cabin of the truck with AC and DC currents independently of the running state of main engine of the truck, and without an auxiliary power unit. The system can be installed on all varieties of transportation trucks and can also be used to provide power for the main engine of the truck and the batteries thereof. Advantages of the present invention can also include savings in fuel, and engine maintenance due to wear and tear from the continuous idling.

The embodiments of the present invention in which an exclusive property or privilege is claimed are defined as follows:

1. A system for powering a truck from a refrigeration unit having a combustion engine, said truck having an engine and an alternator, the system comprising:
    an additional or upgraded alternator connected to the combustion engine of the refrigeration unit for generating direct current;
    at least one battery connected to the additional or upgraded alternator for stabilizing the direct current; and
    an inverter connected to the alternator generating alternative current, and
    a first circuit means for connecting the at least one battery and the inverter to at least two electrical outlets, the first circuit means having a first switching means for directing the direct current, alternative current, or both separately to the at least two electrical outlets;
    a second circuit means for connecting the additional or upgraded alternator to a battery of the truck;
    a second switching means for selectively interrupting the alternator of the truck during track operation when more horse power is needed from the engine of the truck; and
    a water inhibiting structure housing said system.

2. The system according to claim 1, wherein the second switching means is a mechanical switch that stops rotation of the main alternator of the main engine of the truck.

3. The system according to claim 1, wherein the second switch is an electrical switch that interrupts the load of the main engine of the truck, and provide power to the main engine of the truck.

4. The system according to any one of claims 1 to 3, wherein the water inhibiting structure may be selectively ventilated or heated, thus affording protection from external weather conditions and internal heat.

5. The system according to claim 4, wherein the water inhibiting structure comprises a container with a cover adapted to cooperate therewith, and wherein a fan and an opening in the container associated with the fan are provided for moving air from said water inhibiting structure through said opening to the exterior of said structure, and wherein at least one aperture is provided in an area of the container underneath a lip of the cover when the cover is in position mounted on the container, for facilitating provision of ambient air into the refrigeration unit in compensation of the air being pushed by the fan from inside of the unit to the outside thereof; whereby the unit is shielded by the lip and inclement weather is inhibited from entering therein.

6. The system according to claim 5, wherein the water inhibiting structure further comprises a one-way gate at the output of the fan, whereby said gate opens by force of air blowing to the outside when the fan is on and automatically closes by force of gravity when the fan is off in order to inhibit inclement weather from entering into the unit.

7. A method for powering a truck from a refrigeration unit having a combustion engine, said truck having an engine and an alternator, the method comprising the steps of:
    connecting an additional or upgraded alternator to the combustion engine of the refrigeration unit for generating direct current; connecting the additional or upgraded alternator to at least one battery for stabilizing the direct current;
    connecting an inverter to the alternator for generating alternative current,
    connecting the at least one battery and the inverter to at least two electrical outlets via a first circuit means, the first circuit means having a first switching means for directing the direct current, alternative current, or both separately to the at least two electrical outlets;
    connecting the additional or upgraded alternator to a battery of the truck; and
    selectively interrupting the alternator of the truck, during truck operation when more horse power is needed from the engine of the truck.

8. The method according to claim 7, wherein the step of selectively interrupting the alternator of the truck is performed by a mechanical switch that stops rotation of the main alternator of the main engine of the truck.

9. The method according to claim 7, wherein the step of selectively interrupting the alternator of the truck is performed by an electrical switch that interrupts the load of the main alternator of the main engine of the truck.

10. A method according to claim 9, further including the step of providing a first switch for interrupting the power off a refrigeration unit of the truck when the truck is empty, or when the goods transported therein do not require climate control.

11. A method according to claim 9, further including the step of providing a second switch for interrupting a main alternator of the main engine of the truck, and providing power for the main engine of the truck and its batteries.

12. A method according to claim 11, wherein the second switch is a mechanical switch that stops rotation of the main alternator of the main engine of the truck.

13. A method according to claim 11, wherein the second switch is an electrical switch that interrupts the load off the main alternator of the main engine of the truck.

14. A method according to claim 9, further including the step of providing at least the inverter in a waterproof unit that is ventilated, heated, or both thereof for protection from external weather conditions and internal heat.

15. A method according to claim 14, wherein the waterproof unit defines a container with a cover adapted to be placed thereon, and wherein a plurality of holes are provided in an area of the container underneath a lip of the over when the cover is mounted on the container, for facilitating provision of ambient air into the unit in compensation of air being pushed by a fan from the inside of the unit to the outside thereof, whereby, rain and snow are shielded by the lip of the cover and stopped from entering into the unit.

16. A method according to claim 15, wherein the waterproof unit is provided with a one-way gate structure at the output of the fan, which gate opens by force of the air blowing to the outside when the fan is on, and automatically closes by force of gravity when the fan is off, in order to prevent rain and snow from entering into the unit.

\* \* \* \* \*